United States Patent
Battigelli

[15] 3,649,233
[45] Mar. 14, 1972

[54] METHOD OF AND APPARATUS FOR THE PRODUCTION OF GLASS OR OTHER FIBERS FROM THERMOPLASTIC MATERIALS

[72] Inventor: Jean A. Battigelli, Rantigny, France
[73] Assignee: Compagnie De Saint-Gobain, Neuilly-sur-Seine, France
[22] Filed: Mar. 19, 1969
[21] Appl. No.: 808,563

[30] Foreign Application Priority Data

Mar. 21, 1968 France..................................144723

[52] U.S. Cl.................................65/6, 18/2.5 RR, 18/2.6, 65/14, 264/8, 264/12, 264/164
[51] Int. Cl. .......................................................C03b 37/04
[58] Field of Search.................264/8, 12, 164; 18/2.5 R, 2.6, 18/85 R; 65/6, 7, 14, 15, 8, 21

[56] References Cited

UNITED STATES PATENTS

| 180,470 | 8/1876 | Elbers | 65/8 |
| 1,137,814 | 5/1915 | Pazsiczky | 65/8 |
| 2,358,068 | 9/1944 | Hiller | 18/2.6 X |

FOREIGN PATENTS OR APPLICATIONS

| 576,054 | 4/1958 | Italy | 65/6 |

Primary Examiner—S. Leon Bashore
Assistant Examiner—Robert L. Lindsay, Jr.
Attorney—Dale A. Bauer, John L. Seymour, Bauer and Seymour and Samuel Lebowitz

[57] ABSTRACT

The production of fibers from thermoplastic materials, and especially glass fibers from molten vitreous material, by fixing droplets of the material onto sharp points of a horizontally rotating hollow drum, and drawing out the droplets into the form of filaments which are then subjected to a gaseous blast emanating from the interior of the drum or tangentially to the latter to attenuate them into fibrous form, for eventual removal.

24 Claims, 9 Drawing Figures

METHOD OF AND APPARATUS FOR THE PRODUCTION OF GLASS OR OTHER FIBERS FROM THERMOPLASTIC MATERIALS

The present invention relates to the production of fibers from mineral or organic materials in the molten or viscous state, and in particular to the fabrication of glass, rock or slag fibers.

The method in accordance with the invention contemplates withdrawing small drops of the material in a viscous state, by means of roughenings provided on a moving body, particularly a body of revolution rotating at high speed about a horizontal axis, and which come into contact with the viscous material to be fiberized, to form filaments from these droplets held by said roughenings or sharp points, and subjecting these filaments to attenuation or drawing out by means of a gaseous fluid to transform them into fibers.

The invention also contemplates the attenuation of the filaments of material by subjecting them to the action of combustion gases produced by a burner.

The droplets may be withdrawn above a bath of the viscous material adapted to be fiberized.

The method in accordance with the invention may also be executed by bringing the material to be fiberized, in sheet form, into contact with the sharp points carried by the moving body.

Furthermore, the invention contemplates raising the temperature of the droplets, which are entrained by the roughenings or by the sharp points, by any appropriate means, particularly by a radiant heater, soft flames, or infrared rays.

According to another characteristic of the invention, the quantity of viscous material, which is entrained by the roughenings or sharp points of the moving body, is regulated by controlling one or the other, or a combination of the following factors:

a. the temperature of the material brought into contact with the sharp points;
b. the speed of rotation of the revolving body; and
c. the temperature of the sharp points.

According to another characteristic of the invention, the interior of the rotating body may be cooled by some means, such as by the spraying of water or other fluid refrigerant, or by the circulation of fluid.

Other characteristics and advantages of the invention will appear from the following description of several embodiments thereof featuring the above-noted characteristics and making possible the above-noted procedures, which are set forth by way of example only, in conjunction with the accompanying drawings, wherein.

Figure 1:
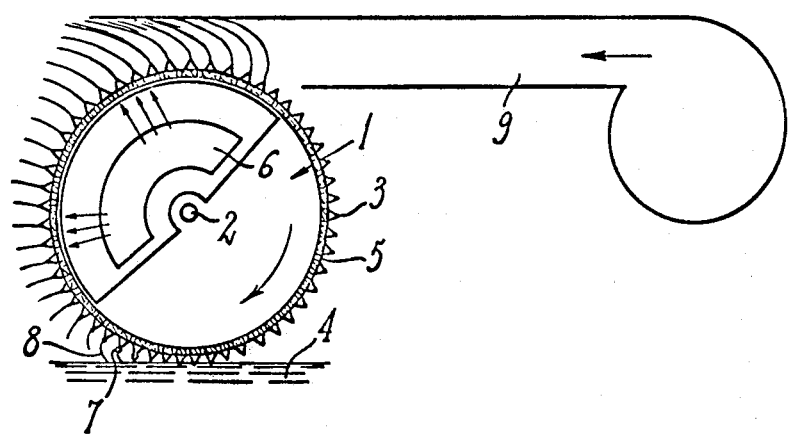
FIG. 1 is a schematic elevation of one embodiment of the invention.

The illustrative embodiment shown in FIG. 1 comprises a hollow drum 1 turning about its horizontal axis 2 and provided on its lateral wall with roughenings or sharp points 3. The peripheral or lateral wall is provided with rows of orifices 5 arranged between the rows of sharp points 3. These sharp points come into confronting relation with a bath 4 of the material to be fiberized, for example, molten glass. A stationary combustion chamber 6, in the shape of a portion of a cylinder, is provided inside drum 1, the gases of which pass through orifices 5. During rotation of drum 1, sharp points 3 serve to withdraw individual droplets 7 of the material from bath 4. As soon as it leaves the bath, each droplet, which is impaled on its respective point, is connected to the bath by a filament 8, drawn out mechanically. This filament is then detached from the bath and is retained by its droplet. As soon as it reaches the zone where the hot gases exhaust from the combustion chamber, the filament is subjected to a drawing out or attenuating action, this drawing out being progressively continued during passage of the filament through this zone. During this drawing out operation, the filament is fed by the material of the droplet. When all the material of the droplet is exhausted, a rupture takes place between the filament drawn out into fibrous form and the sharp point. A blower device 9 effects the evacuation of the attenuated fibers which are produced.

It will be noted that the gases issuing from the combustion chamber 6 serve not only to effect the drawing out of the filaments of material, but also serve to maintain the temperature of the droplets of glass affixed or hooked to the sharp points.

In order to regulate the quantity of material removed by each point, it is possible to control the speed of drum 1, the temperature of the viscous material contained in bath 4, and the temperature of the sharp points.

Figure 2:
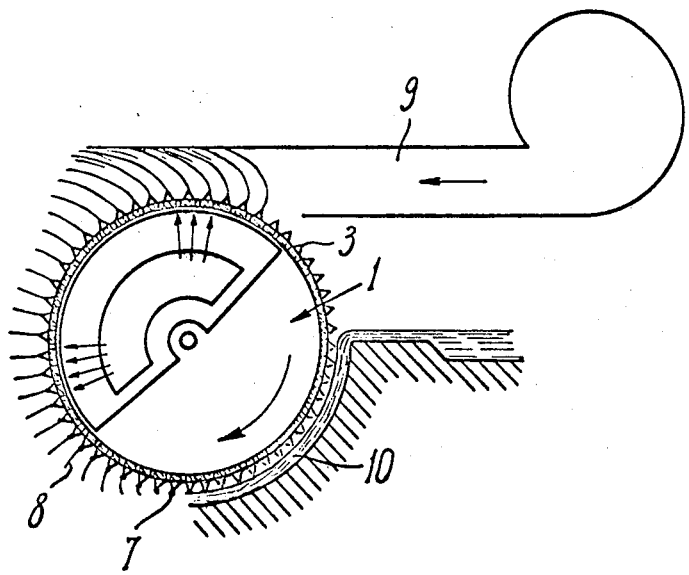
FIGS. 2 and 3 illustrate two variants of the embodiment shown in FIG. 1.

In the embodiment shown in FIG. 2, the viscous material flows onto a spillway 10 forming a sheet of substantially uniform thickness. Sharp points 3 of drum 1 come into confronting relation with and penetrate this sheet to a well-defined depth, and each carries an identical quantity of material into the gaseous jet of the burner disposed on the interior of the drum.

Figure 3:
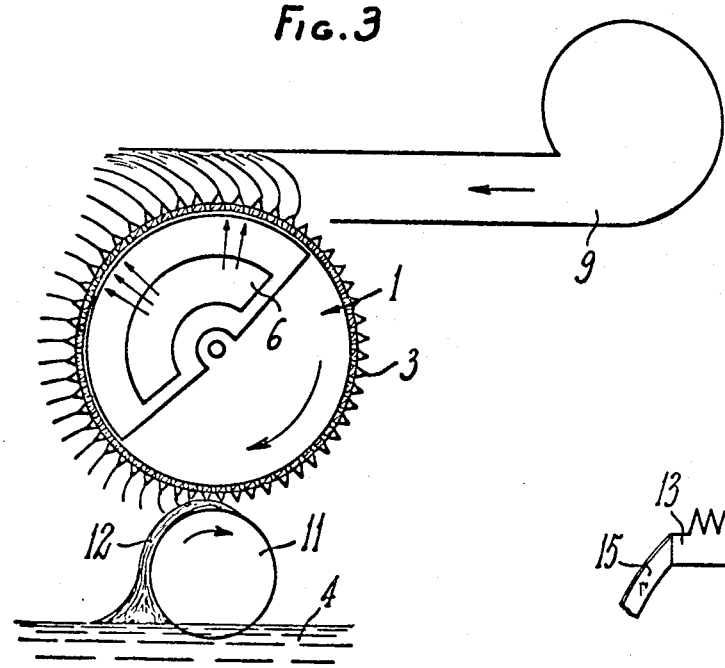

In another variant shown in FIG. 3, a roller 11, turning in the same direction as drum 1, dips into bath 4 of the viscous material, and by virtue of its rotation, entrains a layer of material 12 into confronting relation with the sharp points 3 of the drum.

Figure 4:
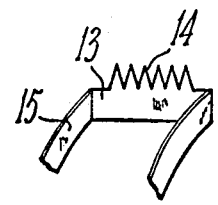
FIG. 4 is a perspective view of the terminal portion of one of the members on the rotating body.
Figure 5:
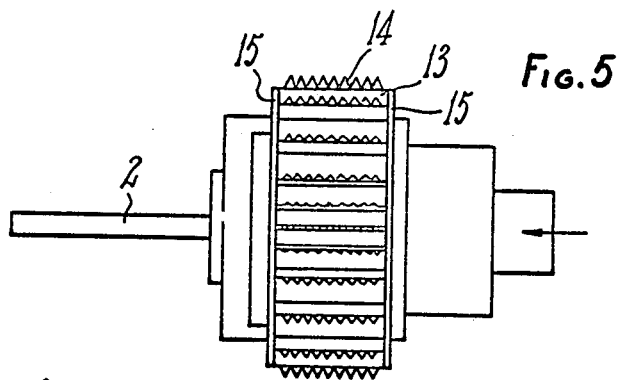
FIG. 5 is a front elevation of the rotary body.

FIGS. 4 and 5 illustrate an embodiment of a rotating body or drum. The latter comprises combs 13, with points 14 constituting the sharp hooking points for the viscous material. These combs may be fixed, for example, by setting each between two cheeks or lateral plates 15, which are connected integrally with shaft 2 of the drum. The number of points constituting the comb may be of the order of 50 to 100, and the space between successive combs may be of the order of 1 centimeter. The drum, for example, may have a diameter of the order of 1 meter and a rotational speed of about 100 r.p.m.

Figure 6:
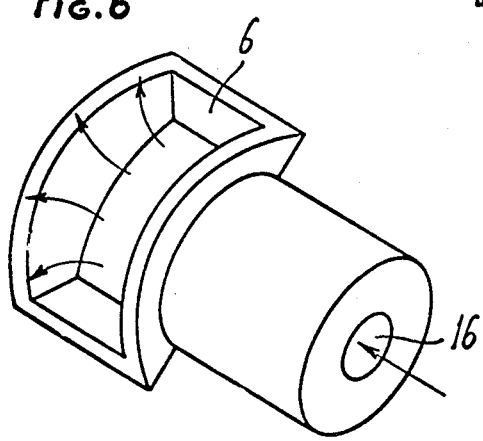
FIG. 6 is a perspective view of a burner used for drawing out the filaments.

The radial burner 6 shown in FIGS. 1, 2 and 3, at the interior of the drum 1, is shown in perspective in FIG. 6, and is fed by conduit 16.

Figure 7:
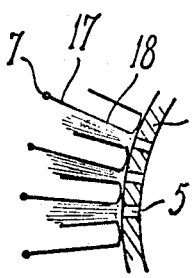
FIG. 7 is a partial sectional view of a different embodiment of a rotary member with means for effecting the priming of the filaments, as an alternative to sharp points or other roughenings.

FIG. 7 shows another form of combs 17, which are constituted in such a way as to provide conduits 18 beyond the rows of orifices 5. This causes the channeling of the combustion gases into contact with droplets 7, thereby reducing the quantity of the required attenuating gases. It is advantageous to bend or curve the extremity of comb 17 so that droplets 7 are located substantially in the axes of the gaseous jets exhausting through conduits 18.

Figure 8:
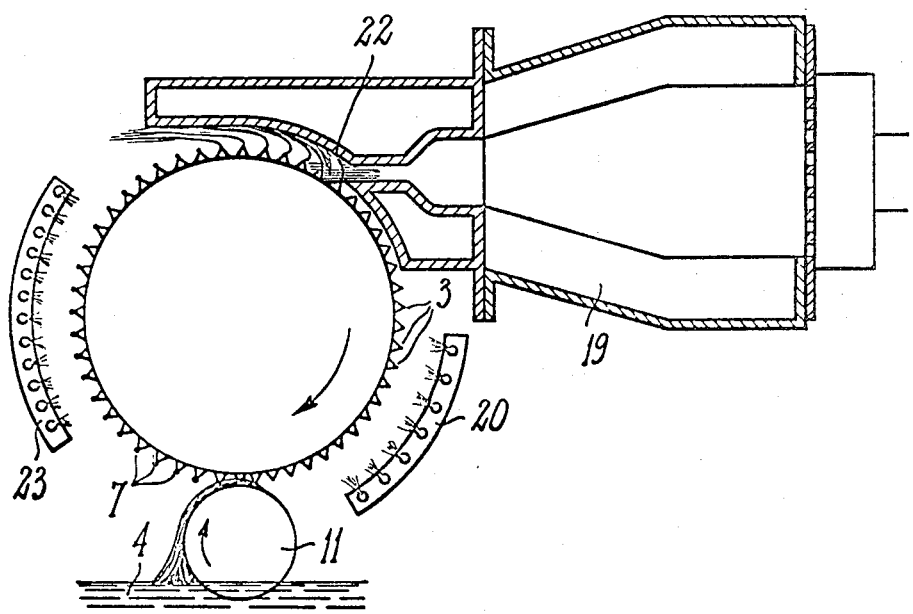
FIG. 8 is a sectional view of another embodiment of the invention.
Figure 9:
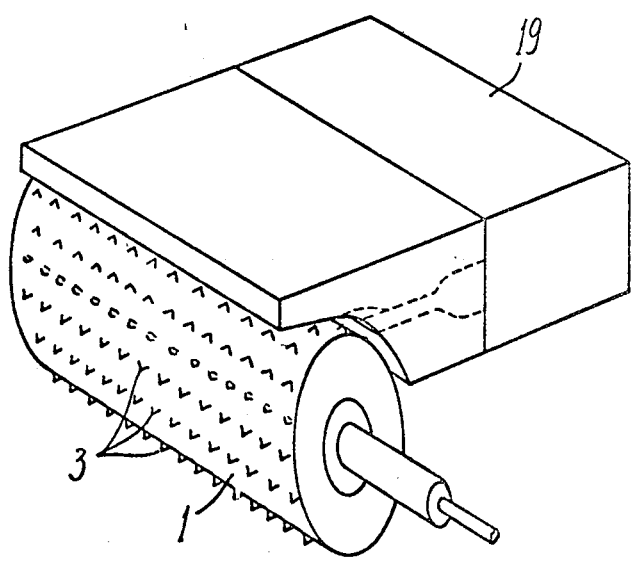
FIG. 9 is a perspective view of the rotary drum and burner shown in FIG. 8.

In FIGS. 8 and 9 is shown an apparatus according to the invention provided with a tangential burner. This apparatus comprises a roller 11 dipping into the bath of molten or viscous material 4, and which coats the sharp points 3 of drum 1. Each point removes a droplet 7 of the material, and presents it into the path of the gaseous jet of high pressure issuing from tangential burner 19. In order to adjust the quantity of material removed by each point, it is possible to control the temperature of the bath of material, the speed of rotation of the drum, and/or the temperature of the sharp points. The temperature of the sharp points may be regulated by means of a heating device 20. The heating at this point may be attained through electrical inductive effects or a group of radiant surface-combustion heaters.

The fineness of the resultant fibers depends on the quantity of material which is fixed on each sharp point, on the temperature of the droplet at the moment that it enters the drawing out zone, on the length of time the droplet remains in the attenuating gaseous jet, and on the speed of this jet. The extent of the attenuating or drawing out zone may be increased by imparting a suitable shape to the ejection orifice 22 of tangential burner 19 which envelops the drum. The droplets may be brought to suitable temperature by a heating device such as, for example, a surface-combustion radiant heater 23, a soft burner, or an infra-red ray heating system.

Drum 1, which is shown in the form of an elongated hollow cylinder (FIG. 9), may be cooled on its inner wall by spraying water or any other cooling liquid thereon.

I claim:

1. The method of producing fibers from a hardenable thermoplastic material in a viscous state, which comprises
    a. rotating a drum provided with a plurality of sharp points on the external surface thereof, and dipping the points in a layer of the thermoplastic material in said viscous state, in confronting relation with said drum, thereby impaling a plurality of individual droplets on said sharp points from said supply,
    b. forming filaments from said droplets by the withdrawing movement of said droplets from said supply and the initiation of the filaments thereat, and
    c. blowing a gaseous fluid against said filaments anchored to the points on the drum, thereby to attenuate said filaments into fine fibers.

2. The method set forth in claim 1, wherein the attenuation of the filaments into fine fibrous form is executed by blowing thereon heated combustion gases in directions extending transversely to the rotary axis of the drum.

3. The method set forth in claim 1, wherein the blowing of the heated gases is directed radially from the interior of the drum through orifices in the later adjacent to said sharp points.

4. The method set forth in claim 3, including the step of evacuating the formed fibers at the conclusion of the attenuation thereof by said radially directed gases.

5. The method set forth in claim 4, wherein the evacuating step is executed by blowing a gas tangentially to the drum at the location thereof diametrally opposite to the location at which the impalement of the droplets takes place.

6. The method set forth in claim 2, wherein the blowing of the heated gas is directed tangentially to the drum in a direction opposite to the travel of the droplets and at a location thereof remote from the location at which the impalement of the droplets occurs.

7. The method set forth in claim 1, including the step of heating the sharp points on the drum before the droplets are impaled thereon.

8. The method set forth in claim 1, including the step of heating the droplets impaled on the sharp points prior to their complete attenuation.

9. The method set forth in claim 1, including the step of cooling the interior of the drum for controlling the temperature of the sharp points on the external lateral surface thereof and the droplets of material impaled thereby.

10. An apparatus for producing fibers from a hardenable thermoplastic material in a viscous state, comprising
    a. a container for a supply of said material in a heated viscous state,
    b. a cylindrical drum mounted for rotary movement on a substantially horizontal axis adjacent to the upper level of said supply within said container,
    c. a plurality of sharp points spaced evenly and closely to each other and projecting outwardly from the external lateral surface of said drum in position to penetrate the upper layer of said supply of viscous material within said container to impale separate droplets thereof as said sharp points move relatively to said layer,
    d. means for rotating said drum to withdraw the impaled droplets from said supply and thereby to form filaments with said droplets at the sources thereof, and the opposite ends leading from said supply and eventually breaking therefrom in consequence of the travel of the droplets from said supply, and
    e. blowing means cooperating with said drum for directing a gaseous blast transversely onto the filaments attached to said drum, to attenuate said filaments into fine fibers and to withdraw them from said drum.

11. An apparatus for producing fibers from a hardenable thermoplastic material in a viscous state, comprising
    a. a container for a supply of said material in a heated viscous state,
    b. an arcuate spillway communicating with said container for flowing therealong a layer of said material,
    c. a cylindrical drum mounted for rotary movement on a substantially horizontal axis, adjacent to said arcuate spillway,
    d. a plurality of sharp points spaced evenly and closely to each other and projecting outwardly from the external lateral surface of said drum in position to penetrate the flowing layer of material on said spillway to impale separate droplets thereof as said sharp points move relatively to said layer,
    e. means for rotating said drum to withdraw the impaled droplets from said layer, and thereby to form filaments with said droplets at the sources thereof, and the opposite ends leading from said points and eventually breaking therefrom in consequence of the travel of the droplets from said layer, and
    f. blowing means cooperating with said drum for directing a gaseous blast transversely onto the filaments attached to said drum, to attenuate said filaments into fine fibers, and to withdraw them from said drum.

12. An apparatus for producing fibers from a hardenable thermoplastic material in a viscous state, comprising
    a. a container for a supply of said material in a heated viscous state,
    b. a substantially horizontal rotary body having the lower portion submerged within said material below the upper level thereof for entraining a layer of the material to the upper portion of said body,
    c. a cylindrical drum mounted for rotary movement on a substantially horizontal axis above said rotary body with the lateral walls of said drum and body spaced from each other slightly more than the thickness of said layer,
    d. a plurality of sharp points spaced evenly and closely to each other and projecting outwardly from the external lateral surface of said drum in position to penetrate the layer entrained by said body, to impale separate droplets thereof as said sharp points move relatively to said moving layer,
    e. means for rotating said drum to withdraw the impaled droplets from said supply and thereby to form filaments with said droplets at the sources thereof, and the opposite ends leading from said points and eventually breaking therefrom in consequence of the travel of the droplets from said layer, and
    f. blowing means cooperating with said drum for directing a gaseous blast transversely onto the filaments attached to said drum, to attenuate said filaments into fine fibers, and to withdraw them from said drum.

13. An apparatus as set forth in claim 10, wherein said plurality of sharp points on the lateral surface of said drum are arranged in a plurality of rows along the elements of the cylinder, with rows of orifices in the lateral wall of the cylinder spaced between said rows of sharp points, and said blowing means includes means disposed on the interior of said drum for blowing hot gases outwardly through said orifices to attenuate the filaments extending from said droplets impaled on said sharp points.

14. An apparatus as set forth in claim 10, wherein said plurality of sharp points on the lateral surface of said drum are arranged in a plurality of rows along the elements of the cylinder, and said blowing means comprises a combustion chamber disposed externally of said drum remote from the location at which the impalement of said droplets occurs, for discharging a blast of attenuating gases tangentially to the drum in countercurrent relation to the travel of the droplets.

15. The method set forth in claim 1, wherein the hardenable thermoplastic material is a molten vitreous composition for producing glass fibers.

16. An apparatus as set forth in claim 13, wherein said blowing means comprises a blowing device disposed externally of the drum and adapted to blow a gas tangentially of the drum to evacuate the attenuated fibers.

17. An apparatus as set forth in claim 13, wherein said sharp points in each row of the cylindrical drum are constituted by the terminal portion of a comb device with lateral plates extending from the opposite ends of said comb device for connection to the central shaft of said drum.

18. An apparatus as set forth in claim 13, wherein said sharp points in each row of the cylindrical drum are constituted by a comb device affixed to the peripheral wall of said drum between adjacent rows of said orifices, each comb device having radial arms of unequal length with the longer arm having the multiple sharp points at its outer edge while the shorter arm serves as a wall of a conduit for guiding the gases issuing from the orifices against the droplets impaled on said sharp points.

19. An apparatus as set forth in claim 14, including an extension from the discharge slot of said combustion chamber overlying a portion of the periphery of the drum to enhance the attenuating effects on the filaments extending from the droplets of material impaled on said sharp points.

20. An apparatus as set forth in claim 10, including heating means for said sharp points spaced from said drum before the droplets are impaled thereon.

21. An apparatus as set forth in claim 10, including heating means for the lateral surface of said drum and the droplets impaled on the sharp points thereof disposed between said container and said blowing means.

22. An apparatus as set forth in claim 13, including means for cooling the interior of said drum.

23. An apparatus as set forth in claim 13, wherein said blowing means on the interior of said drum includes a combustion chamber for generating the hot attenuating gases therein.

24. An apparatus as set forth in claim 13, including a supply conduit connected to said blowing means on the interior of said drum for supplying hot gases to said blower.

* * * * *